(12) United States Patent
Desai et al.

(10) Patent No.: US 10,586,038 B2
(45) Date of Patent: Mar. 10, 2020

(54) SECURE STACK OVERFLOW PROTECTION VIA A HARDWARE WRITE-ONCE REGISTER

(71) Applicant: QUALCOMM INCORPORATED, San Diego, CA (US)

(72) Inventors: Mamta Desai, San Diego, CA (US); Ashutosh Shrivastava, San Diego, CA (US); Dhamim Packer Ali, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 158 days.

(21) Appl. No.: 15/699,646

(22) Filed: Sep. 8, 2017

(65) Prior Publication Data
US 2019/0080082 A1    Mar. 14, 2019

(51) Int. Cl.
*G06F 21/00* (2013.01)
*G06F 21/52* (2013.01)
*G06F 21/80* (2013.01)
*G06F 7/58* (2006.01)

(52) U.S. Cl.
CPC .............. *G06F 21/52* (2013.01); *G06F 21/80* (2013.01); *G06F 7/582* (2013.01); *G06F 2221/034* (2013.01)

(58) Field of Classification Search
CPC .......... G06F 21/52; G06F 21/80; G06F 7/582; G06F 2221/034
See application file for complete search history.

(56) References Cited

U.S. PATENT DOCUMENTS

| | | | |
|---|---|---|---|
| 6,775,661 B1 | 8/2004 | Redner | |
| 7,581,089 B1 | 8/2009 | White | |
| 8,018,271 B2 | 9/2011 | Shimura | |
| 8,677,189 B2 | 3/2014 | Das | |
| 2003/0182572 A1* | 9/2003 | Cowan | G06F 12/1408 726/22 |
| 2006/0225134 A1* | 10/2006 | Conti | G06F 21/52 726/22 |
| 2008/0140884 A1 | 6/2008 | Enbody et al. | |
| 2011/0040825 A1 | 2/2011 | Ramzan et al. | |
| 2012/0066346 A1 | 3/2012 | Virmani et al. | |
| 2013/0013965 A1 | 1/2013 | Guillemin et al. | |
| 2014/0143825 A1 | 5/2014 | Behrendt et al. | |
| 2015/0010148 A1* | 1/2015 | Polzin | G09C 1/00 380/44 |
| 2016/0028767 A1* | 1/2016 | Ripoll | H04L 63/1466 726/23 |

* cited by examiner

*Primary Examiner* — Christopher C Harris
(74) *Attorney, Agent, or Firm* — Smith Tempel Blaha LLC

(57) ABSTRACT

Systems and methods are disclosed for providing stack overflow protection on a system on chip via a hardware write-once register. An exemplary embodiment of an system on chip comprises a hardware write-once register, a boot processor, and one or more processor subsystems. The boot processor is configured to execute a read only memory (ROM) image which initializes the hardware write-once register with a first numeric value in response to the system on chip being powered on. The one or more processor subsystems have an associated software image configured to use the first numeric value in the hardware write-once register as a stack canary value to combat stack overflow attacks.

21 Claims, 6 Drawing Sheets

SECURE STACK OVERFLOW PROTECTION VIA A HARDWARE WRITE-ONCE REGISTER

DESCRIPTION OF THE RELATED ART

Stack overflow occurs when a program writes to a memory address on the program's call stack outside of the intended data structure. In other words, the program writes more data to a buffer located on the call stack than what is actually allocated for that buffer. Stack overflow may be deliberately caused as part of an attack known as "stack smashing".

A common method for protecting against stack smashing involves the use of software-implemented stack canaries. Stack canaries are used to detect a stack buffer overflow before execution of malicious code can occur. This method works by placing, at the start of a program, a random value (referred to as a "stack canary value") in memory just before the stack return pointer. Buffer overflows may overwrite memory from lower to higher memory addresses (or vice versa), so in order to overwrite the return pointer and take control of the process, the stack canary value must also be overwritten. The stack canary value may be checked to make sure that it has not changed before a routine uses the return pointer on the stack.

Stack canaries may be defined in two ways: (1) a static canary; and (2) a dynamic canary. In static canary implementations, software may define a constant, static hard-coded value. For every boot, the same stack canary value is used to check the value of the stack at the end of the program. Static canaries are prone to timing side-channel-based attacks because the stack canary value may be predicted. In dynamic canary implementations, software uses a random number generator to define the stack canary value. Dynamic canaries are more secure because the value is a unique number generated for each run.

Software-implemented stack canaries may be problematic in certain types of memory-constrained systems. Embedded systems, such as, Internet of things (IoT) systems typically have relatively small random access memory (RAM) and read only memory (ROM) memories, which may require software images to reduce usage of RAM and ROM memories as much as possible. The software images comprise executable content or code tied to a particular processor (e.g., central processing unit (CPU), digital signal processor (DSP), etc.) that may or may not have a kernel (e.g., threads, processes, etc.). A system on chip (SoC) may comprise multiple processors, CPUs, DSPs, and other subsystems designed to provide specialized functions (e.g., power, computation, security, etc.). In this context, a software image refers to the executable content or code associated with these subsystems and which may be stored in ROM, RAM, etc. Software images may achieve this by sharing code and libraries across software images. However, because each software image uses a different stack canary, more ROM and RAM memory may be needed. For example, different RAM memory may be used for the stack canary value for each software image. Each software image may also have to include a pseudo random number generator (PRNG) driver for generating a dynamic canary.

Software-implemented stack canaries also present vulnerability issues in other types of integrated circuits (e.g., system on chip (SoC)). If the SoC uses a static canary, the canary value may be allocated in a ROM region to prevent tampering. However, a dynamic canary must be allocated in a read/write region because it is generated at runtime, which presents a vulnerability that it can be tampered with/modified, thereby making the stack smashing protection feature ineffective. For ROM libraries shared with subsequent software images, the compiler may have added instructions for the stack smashing protection feature using the address of the dynamic canary used by the ROM code. Once control is transferred from one software image to another subsequent software image, it may reclaim the memory allocated for the ROM dynamic canary in the read/write region, thereby increasing the attack surface. Potential tampering of the dynamic canary region may be prevented by configuring memory management unit (MMU) page tables of the canary memory region as read only. However, these solutions have various limitations. For example, software images have to rely on the MMU hardware block, which may or may not be available depending on the cost of the processor(s) in the system. Even when an MMU is used, given a page configuration size of 4 KB and a 4-byte canary value, there will be a waste of 4 KB for each canary value. Subsequent software images may disable the MMU or change certain region attributes, leaving the canary value vulnerable to tampering even after the previous image had secured the dynamic stack canary value as read only.

Accordingly, there is a need for improved systems and methods for providing scalable and secure stack overflow protection in different types of integrated circuits.

SUMMARY OF THE DISCLOSURE

Systems and methods are disclosed for providing secure stack overflow protection on a system on chip (SoC) via a hardware write-once register. One embodiment is a method for providing stack overflow protection in an SoC having a first processor and a hardware write-once register. The method involves generating, by the first processor, a first numeric value. The hardware write-once register is initialized with the first numeric value. The SoC uses the first numeric value in the hardware write-once register as a stack canary value to combat stack overflow attacks.

An embodiment of an SoC comprises a hardware write-once register, a processor, and one or more software images. The processor is configured to execute a read only memory (ROM) image which initializes the hardware write-once register with a first numeric value in response to the system on chip being powered on. The one or more software images are configured to use the first numeric value in the hardware write-once register as a stack canary value to combat stack overflow attacks.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

The term "software image" refers to executable content or code tied to a particular processor (e.g., central processing unit (CPU), digital signal processor (DSP), etc.) that may or may not have a kernel (e.g., threads, processes, etc.). A system on chip (SoC) may comprise multiple processors, CPUs, DSPs, and other subsystems designed to provide specialized functions (e.g., power, computation, security, etc.). In this context, the term "software image" refers to the executable content or code that runs on these subsystems.

Figure 1:
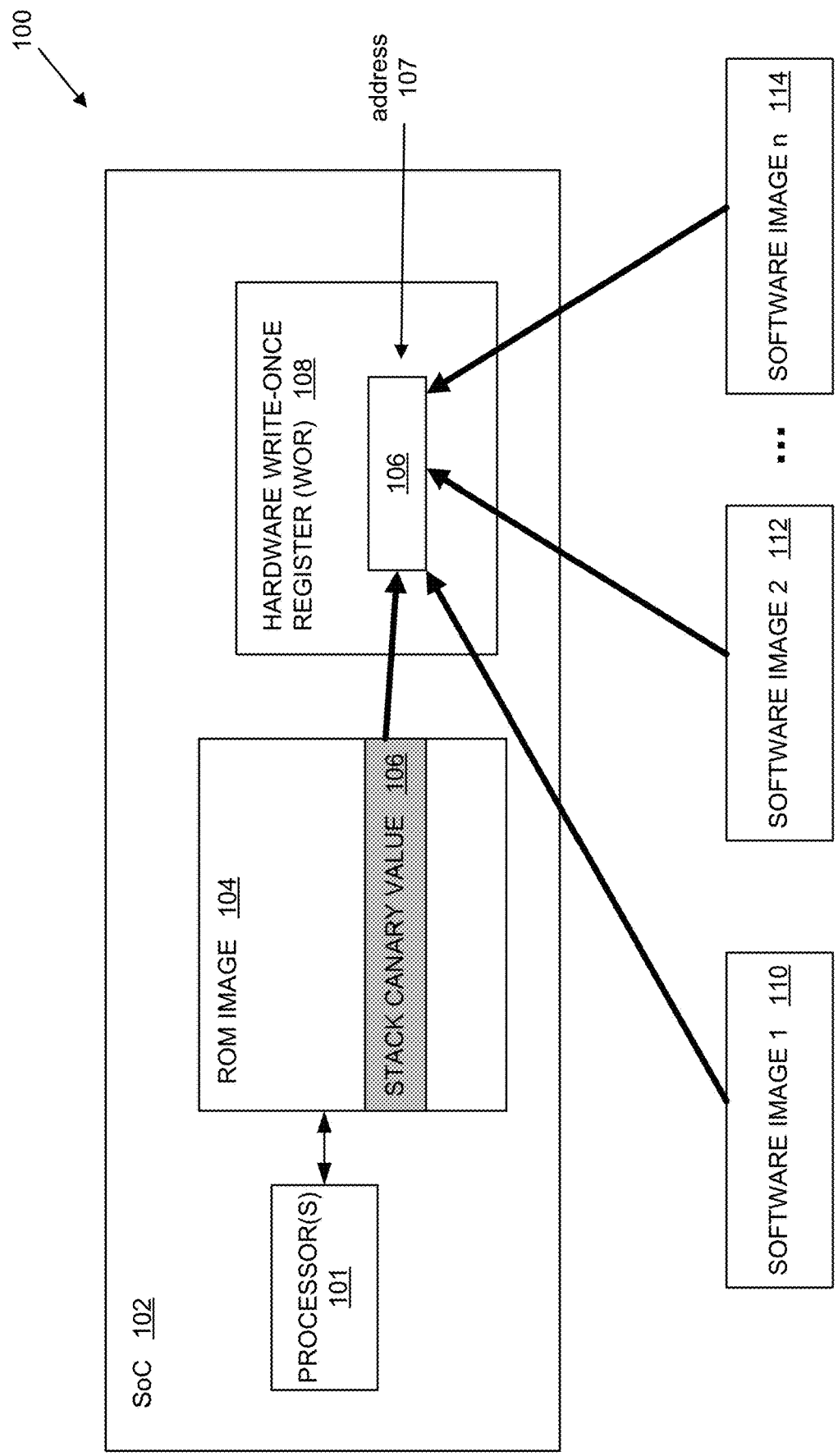
FIG. 1 is a block diagram of an embodiment of a system for providing secure stack overflow protection in an SoC using a hardware write-once register.

FIG. 1 illustrates an embodiment of a system 100 for providing secure stack overflow protection in a system on chip (SoC) 102 via a hardware write-once register 108. It should be appreciated that the SoC 102 may comprise any type of semiconductor chip, embedded system, integrated circuit(s), etc. used in a variety of computing devices, including, for example, a personal computer, a workstation, a server, a laptop computer, a gaming console, an Internet of things (IoT) device, and a portable computing device (PCD), such as a cellular telephone, a smartphone, a portable digital assistant (PDA), a portable game console, a navigation device, a tablet computer, a fitness computer, and a wearable device (e.g., a sports watch, a fitness tracking device, etc.), and other battery-powered devices with a wireless connection or link.

Various exemplary SoC implementations are described below in detail with reference to FIGS. 3-6. As an introductory matter, however, the general structure and operation of an SoC 102 for providing secure stack overflow protection via the hardware write-once register 108 will be described. As illustrated in FIG. 1, the SoC 102 comprises one or more processing devices 101 (e.g., central processing unit (CPU), graphics processing unit (GPU), digital signal processor (DSP), processing subsystem(s), etc.), a read only memory (ROM) configured to store a ROM image 104 (e.g., a boot program loaded into ROM during boot-up), and a hardware write-once register 108. The SoC 102 uses the hardware write-once register 108 to store a stack canary value 106 at an address 107, which is used by each of a plurality of software images 110, 112, and 114 to access and implement a scalable and secure stack smashing protection feature.

The hardware write-once register 108 may comprise any desirable circuit(s), including, for example, one or more flip-flops, latches, other circuits or secure memory elements to which the stack canary value 106 may be written once per device boot-up and, once written, cannot be modified until a subsequent shutdown and boot-up. In an embodiment, the hardware write-once register 108 may comprise any hardware device(s) to which the SoC 102 may detect a write and, in response, automatically lock itself without requiring, for example, any additional configuration bits to be programmed for the locking functionality. In this manner, the hardware write-once register 108 provides secure write protection for ensuring that the stack canary value 106 cannot be tampered with once it is written to the address 107. In an exemplary embodiment, the hardware write-once register 108 comprises a portion of system memory that may be direct memory mapped without MMU initialization. The address of the stack canary value 106 in the system memory map comprises the base address 107 of the hardware write-once register 108.

As further illustrated in FIG. 1, a ROM image 104 may initialize the hardware write-once register 108 upon boot-up with a random number generated by, for example, a pseudo random number generator (PRNG) block. Once the random number is stored in the hardware write-once register 108, the stack canary value 106 is locked and cannot be changed for the duration of the present operational session of the SoC 102. Each of a plurality of software images 110, 112, and 114 may access the stack canary value 106 by, for example, referencing the base address 107 of the hardware write-once register 108.

In this regard, the hardware write-once register 108 provides secure and scalable stack overflow protection. With the stack canary value 106 stored and locked in the hardware write-once register 108, malicious attacks will be unable to tamper with the value of stack canary. After the stack canary value 106 is initially written to the hardware write-once register 108, any subsequent attempts to write to the base address 107 will fail. As mentioned above, in response to the SoC 102 being powered on, the ROM image 104 may write a numeric value generated by a PRNG block to the hardware write-once register 108, and lock the corresponding secure memory element(s) for further writes. At each reset, the stack canary value 106 may be changed and, therefore, act as a counter measure to timingside-channel attacks.

It should be further appreciated that the stack canary value 106 may be implemented without memory allocation. Each of the software images 110, 112, and 114 may use the hardware write-once register 108 for stack overflow protection, which eliminates the need to retain and/or reserve any memory on the SoC 102. As mentioned above, the memory savings may be particularly advantageous for certain types of integrated circuits (e.g., memory-constrained IoT devices). The hardware-implemented stack overflow protection may be provided without memory management mapping, which may be beneficial in IoT-type integrated circuits, chips, SoCs, etc. that do not incorporate a memory management unit (MMU). Furthermore, additional memory savings may be realized by permitting the SoC 102 to incorporate a single instance of a pseudo-random number generator (PRNG) in ROM that may be used by a plurality of software images.

Figure 2:
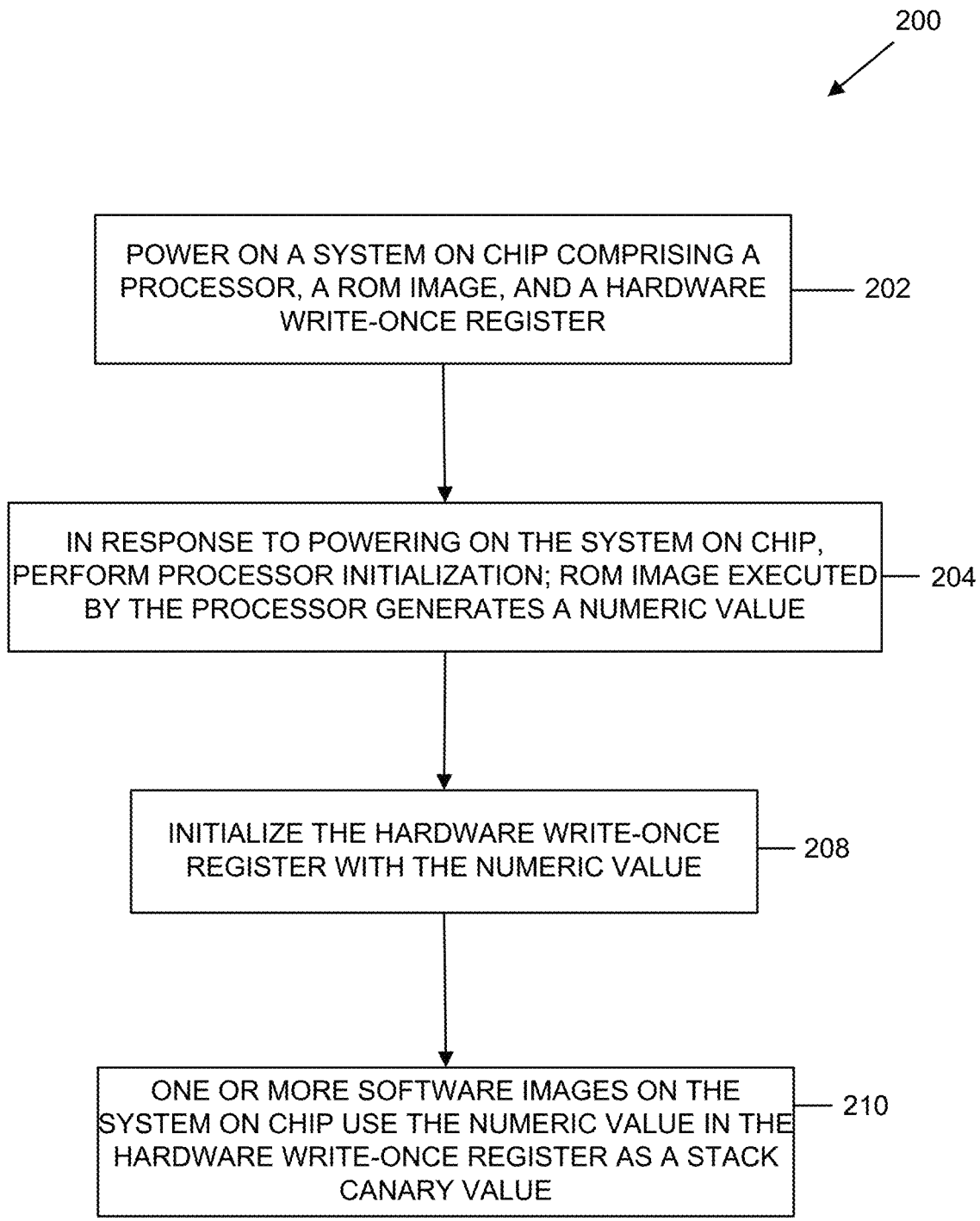
FIG. 2 is a flowchart illustrating an embodiment of a method implemented in the SoC of FIG. 1 for providing secure stack overflow protection via a hardware write-once register.
Figure 4:
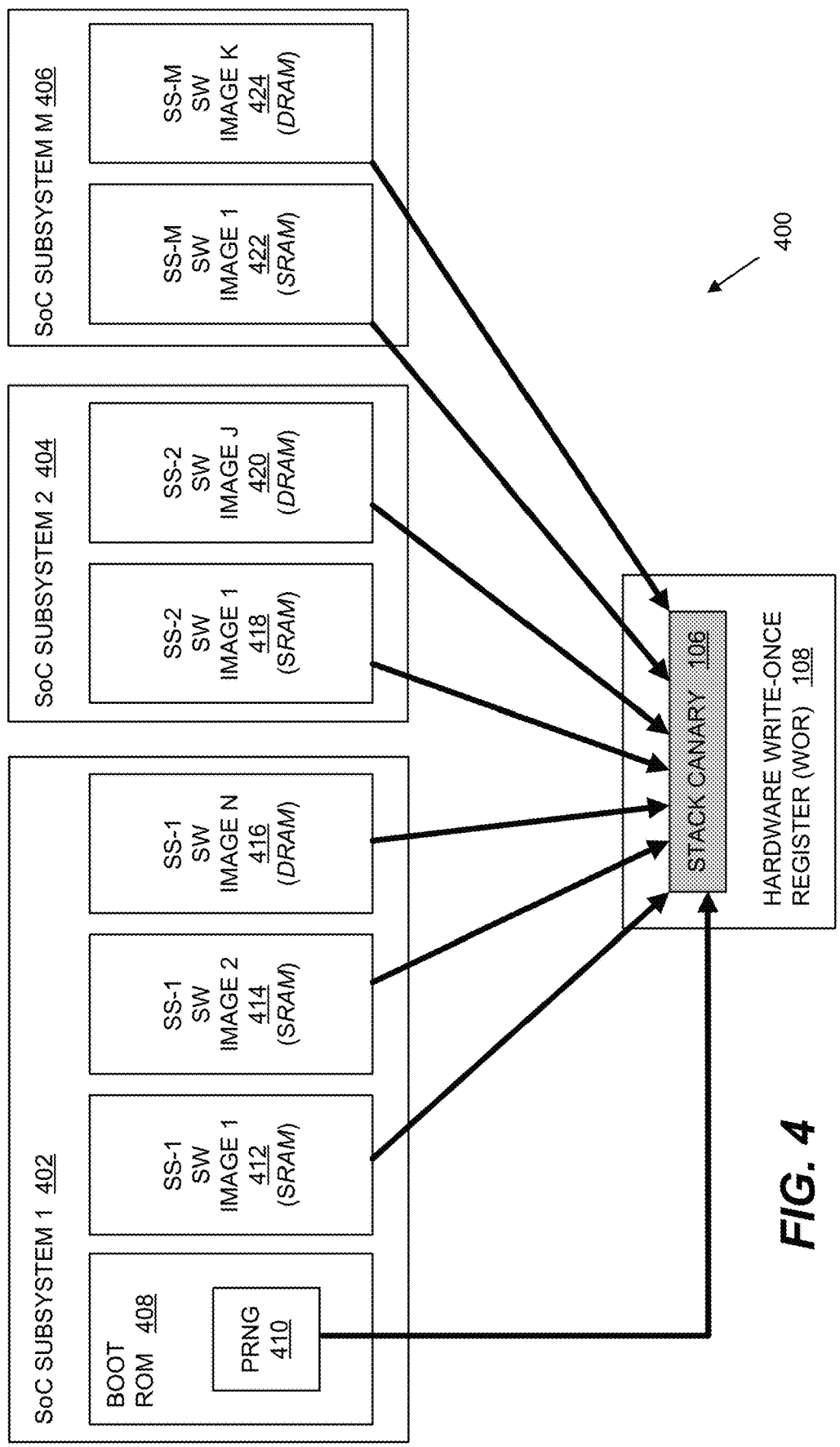
FIG. 4 is a block diagram illustrating an embodiment of an SoC comprising a plurality of subsystems for implementing secure stack overflow protection using a hardware write-once register.

FIG. 2 is a flowchart illustrating an embodiment of a method 200 implemented in the SoC 102 for providing secure stack overflow protection via the hardware write-once register 108. At block 202, a computing device incorporating the SoC 102 (e.g., an IoT device, a portable computing device, etc) may be powered on or reset. In response to the power-on and/or reset condition, at block 204, a numeric value may be generated by, for example, a PRNG block associated with the ROM image 104. As described below, the ROM image 104 may comprise a secure boot ROM image 408 (FIG. 4). At block 206, the PRNG block (or a software driver associated with the PRNG block) may securely initialize the stack canary value 106 with the numeric value generated by the PRNG block. At block 210, one or more software images associated with the SoC 102 may use the numeric value in the hardware write-once register 108 as a stack canary value. It should be appreciated that the software images 110, 112, and 114 may initialize their respective stack canary values via, for example, a scatter loader file that executes at build time. The scatter loader file may retrieve the stack canary value 106 from the hardware write-once register 108 via, for example, the base address 107 and, in response, initialize a stack_chk_guard variable with the numeric value of the random number generated by the PRNG block. As known in the art, a scatter loader file comprises an input to a linker that may instruct where to locate the different regions of the software image in memory (e.g., load and runtime view of the executable).

Figure 3:
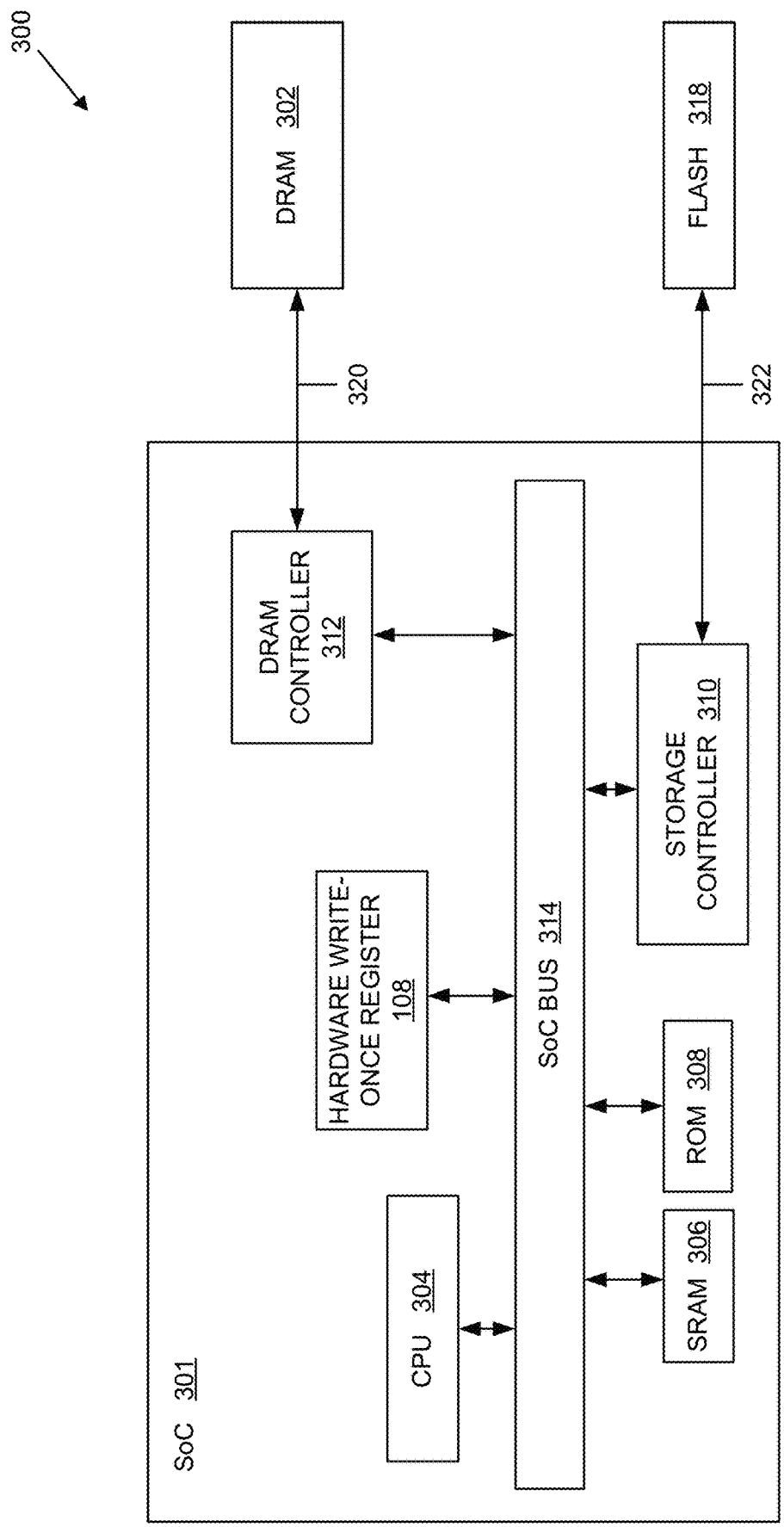
FIG. 3 is a block diagram illustrating another embodiment of an SoC for implementing secure stack overflow protection using a hardware write-once register.

As mentioned above, the hardware-based stack canary feature described above may be particularly advantageous in certain types of SoC implementations. FIG. 3 illustrates a system 300 comprising another embodiment of an SoC 301 incorporating the hardware write-once register 108 for providing scalable and secure stack overflow protection. As illustrated in FIG. 3, the SoC 301 is electrically coupled to a volatile memory. In the embodiment of FIG. 3, the volatile memory comprises a dynamic random access memory (DRAM) 302 electrically coupled to the SoC 301 via a double data rate (DDR) interface 320. DRAM 302 may comprise one or more DRAM chips with each chip having a plurality of banks (e.g., 8 banks per DRAM chip).

As further illustrated in FIG. 3, the SoC 301 comprises various on-chip components. The SoC 301 comprises one or more memory clients (e.g., central processing unit(s) (CPU) 304, graphics processing unit(s) (GPU) (not shown), digital signal processor(s) (DSPs) (not shown)), a static random access memory (SRAM) 306, read only memory (ROM) 308, a DRAM controller 312, and a storage controller 310 interconnected via SoC bus 314. The CPU 304 may support a high-level operating system (O/S). The storage controller 310 may be electrically coupled via a storage bus 322 to external non-volatile storage memory, such as, for example, flash memory 318 or other non-volatile memory device(s). Storage controller 310 controls communication with the external storage memory. The DRAM controller 312 controls communication with DRAM 302.

FIG. 4 illustrates another embodiment of an SoC 400 comprising a plurality of SoC subsystems for implementing secure stack overflow protection using the hardware write-once register 108. The SoC implementation in FIG. 4 may be particularly useful for certain types of applications (e.g., mobile, automotive, etc.). It should be appreciated that SoCs used in mobile and/or automotive application may comprise high-speed DDR memory (e.g., DRAM) and may not be memory constrained. During bootup, the DRAM memory may be initialized and trained so that all the software executables/images may begin using the DDR memory for their code/stack/heap/etc. right away and not be bottlenecked with limited and costly (e.g., area cost, die cost) SRAM memories. It should be further appreciated that certain types of IoT chips may also be configured in this manner where DDR memory is used.

In the embodiment of FIG. 4, the SoC 400 comprises a plurality of SoC processor subsystems, each of which may have associated software image(s) that are stored and executed from on-chip memory (e.g., SRAM 306), dedicated ROM (e.g., secure boot ROM 408), and/or off-chip memory (e.g., DRAM 302). As illustrated in FIG. 4, an SoC subsystem 402 (e.g., a boot processor, a CPU) may comprise a secure boot ROM 408 having an associated PRNG block 410. The SoC subsystem 402 further comprises a plurality of software images. Software images 412 and 414 are stored and executed from SRAM 306. Software image 416 may be stored and executed from DRAM 302. Additional SoC processor subsystems may also comprise software image(s) that are stored and executed from either the SRAM 306 or the DRAM 302. In the embodiment of FIG. 4, the SoC subsystem 404 may comprise a plurality of software images 418 and 420. Software image 418 is stored and executed from SRAM 306. Software image 420 is stored and executed from DRAM 302. Furthermore, the SoC subsystem 406 may comprise a plurality of software images 422 and 424. Software image 422 is stored and executed from SRAM 306. Software image 424 is stored and executed from DRAM 302.

Upon powering on or resetting a computing device incorporating the SoC 400, the PRNG block 410 associated with the secure boot ROM 408 may securely initialize the stack canary value 106 in the hardware write-once register 108 with the numeric value generated by the PRNG block 410. Each of the software images 412, 414, 416, 418, 420, 422, and 424 associated with the SoC subsystems 402, 404, and 406 may use the numeric value in the hardware write-once register 108 as a stack canary value.

Figure 5:
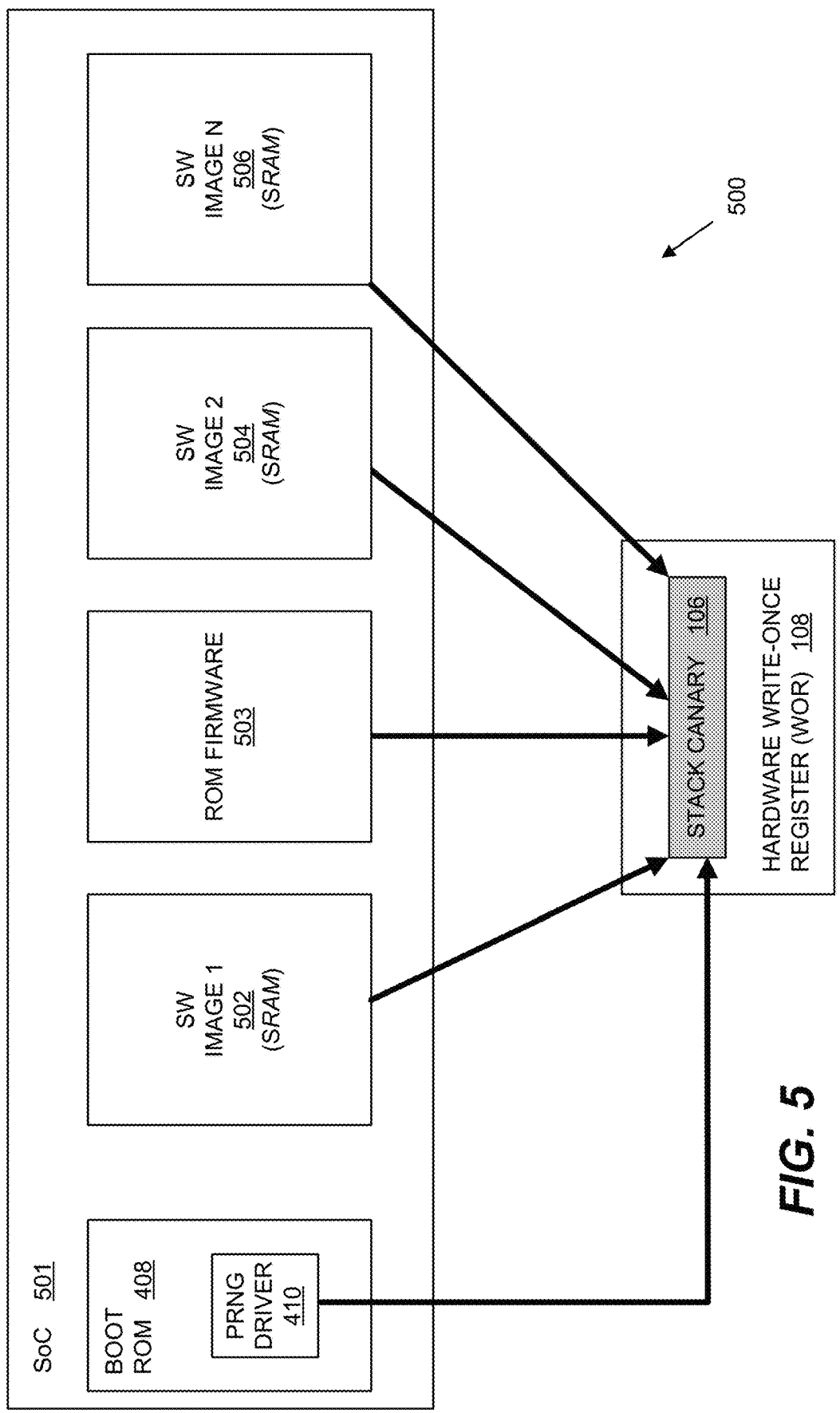
FIG. 5 is a block diagram illustrating another embodiment of an SoC for implementing secure stack overflow protection using a hardware write-once register.

FIG. 5 illustrates an IoT SoC subsystem 500 comprising another embodiment of an SoC 501. It should be appreciated that certain types of IoT SoCs may be specially configured to minimize costs, which may involve a relatively low memory footprint and, therefore, a limited number of external components and/or memories (e.g., DRAM). These memory-constrained IoT SoC subsystems may timeshare a limited SRAM memory. Therefore, different software executables/images may have to be mapped in the limited SRAM memory to not overlap and support effective time-sharing. In the embodiment of FIG. 5, the SoC 501 comprises the secure boot ROM 408, ROM firmware 503, and a plurality of software images 502, 504, and 506. Software images 502, 504, and 506 are stored and executed from SRAM 306. ROM firmware 503 may comprise firmware used in mission-mode post boot-up processing. As illustrated in FIG. 5, upon powering on or resetting the IoT device, the PRNG block 410 associated with the secure boot ROM 408 may securely initialize the stack canary value 106 in the hardware write-once register 108 with the numeric value generated by the PRNG block 410. Each of the software images 502, 504, and 506 and the ROM firmware 503 may use the numeric value in the hardware write-once register 108 as a stack canary value.

Figure 6:
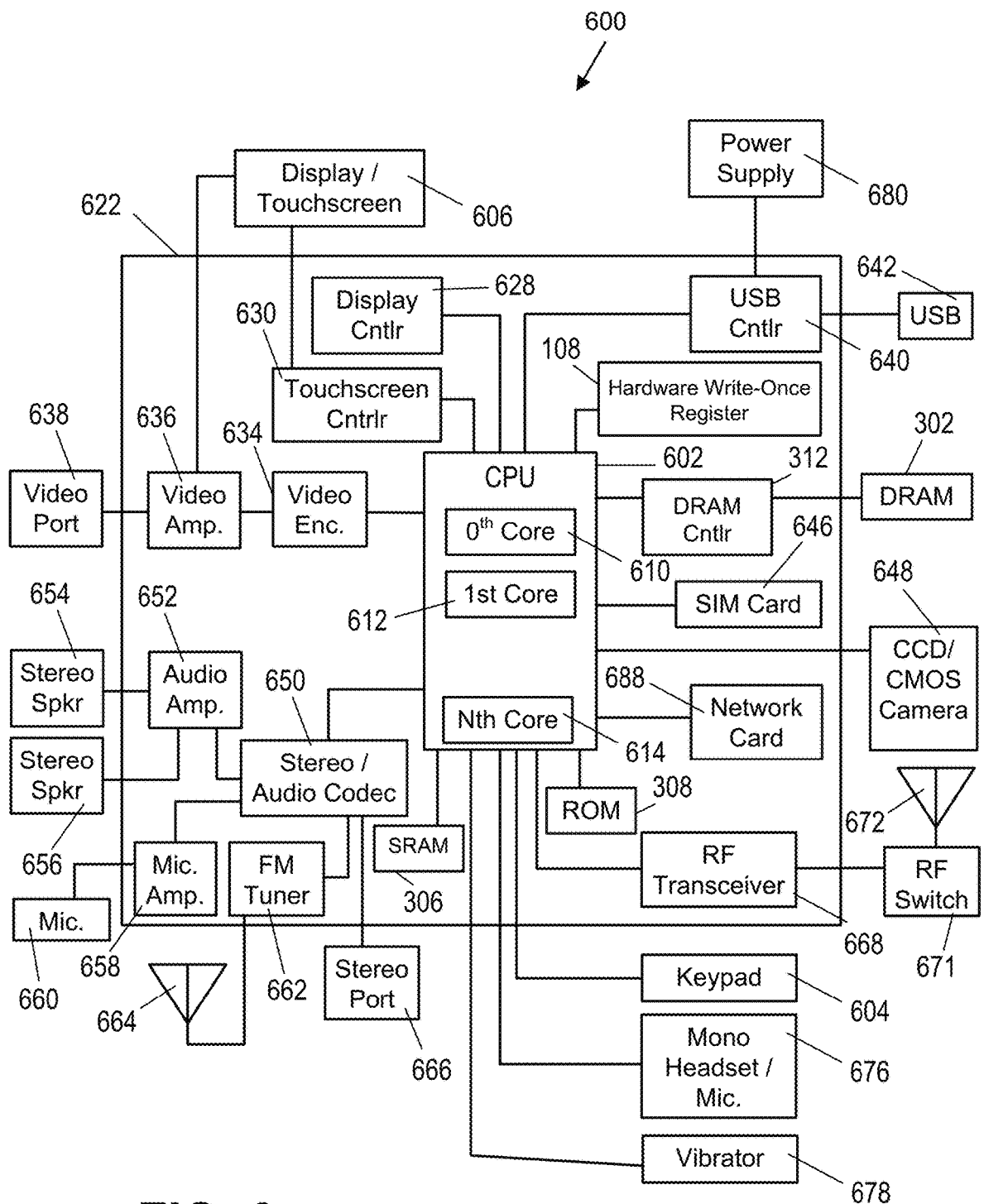
FIG. 6 is a block diagram of an exemplary embodiment of a portable communication device for incorporating the system of FIG. 1.

FIG. 6 illustrates an exemplary portable communication device (PCD) 600 comprising another embodiment of an SoC 622 for providing secure stack overflow protection via the hardware write-once register 108. It will be readily appreciated that certain components of the SoC implementations described above may be included on the SoC 622 (e.g., DRAM controller 312, hardware write-once register 108, SRAM 306, ROM 308) while other components (e.g., DRAM 302) may be external components coupled to the SoC 622. The SoC 622 may include a multicore CPU 602. The multicore CPU 602 may include a zeroth core 610, a first core 612, and an Nth core 614. One of the cores may comprise, for example, a graphics processing unit (GPU) with one or more of the others comprising a CPU for supporting the O/S.

A display controller 628 and a touch screen controller 630 may be coupled to the CPU 602. In turn, the touch screen display 606 external to the on-chip system 622 may be coupled to the display controller 628 and the touch screen controller 630. FIG. 6 further shows that a video encoder 634 (e.g., a phase alternating line (PAL) encoder, a sequential color a memoire (SECAM) encoder, or a national television system(s) committee (NTSC) encoder) is coupled to the multicore CPU 602. Further, a video amplifier 636 is coupled to the video encoder 634 and the touch screen display 606. Also, a video port 638 is coupled to the video amplifier 636. A universal serial bus (USB) controller 640 is coupled to the multicore CPU 602. A USB port 642 is coupled to the USB controller 640.

Further, as shown in FIG. 6, a digital camera 648 may be coupled to the multicore CPU 602. In an exemplary aspect, the digital camera 648 is a charge-coupled device (CCD) camera or a complementary metal-oxide semiconductor (CMOS) camera. A stereo audio coder-decoder (CODEC) 650 may be coupled to the multicore CPU 602. Moreover, an audio amplifier 652 may coupled to the stereo audio CODEC 650. In an exemplary aspect, a first stereo speaker 654 and a second stereo speaker 656 are coupled to the audio amplifier 652. FIG. 6 shows that a microphone amplifier 658 may be also coupled to the stereo audio CODEC 650. Additionally, a microphone 660 may be coupled to the microphone amplifier 658. In a particular aspect, a frequency modulation (FM) radio tuner 662 may be coupled to the stereo audio CODEC 650. Also, an FM antenna 664 is coupled to the FM radio tuner 662. Further, stereo headphone port 666 may be coupled to the stereo audio CODEC 650.

FIG. 6 further illustrates that a radio frequency (RF) transceiver 668 may be coupled to the multicore CPU 602. An RF switch 671 may be coupled to the RF transceiver 668 and an RF antenna 672. A keypad 604 may be coupled to the multicore CPU 602. Also, a mono headset with a microphone 676 may be coupled to the multicore CPU 602. Further, a vibrator device 678 may be coupled to the multicore CPU 602.

FIG. 6 also shows that a power supply 680 may be coupled to the on-chip system 622. In a particular aspect, the power supply 680 is a direct current (DC) power supply that provides power to the various components of the PCD 600 that require power. Further, in a particular aspect, the power supply is a rechargeable DC battery or a DC power supply that is derived from an alternating current (AC) to DC transformer that is connected to an AC power source.

FIG. 6 further indicates that the PCD 600 may also include a network card 688 that may be used to access a data network, e.g., a local area network, a personal area network, or any other network. The network card 688 may be a Bluetooth network card, a WiFi network card, a personal area network (PAN) card, a personal area network ultra-low-power technology (PeANUT) network card, a television/cable/satellite tuner, or any other network card well known in the art. Further, the network card 688 may be incorporated into a chip, i.e., the network card 688 may be a full solution in a chip, and may not be a separate network card 688.

As depicted in FIG. 6, the touch screen display 606, the video port 638, the USB port 642, the camera 648, the first stereo speaker 654, the second stereo speaker 656, the microphone 660, the FM antenna 664, the stereo headphones 666, the RF switch 671, the RF antenna 672, the keypad 674, the mono headset 676, the vibrator 678, and the power supply 680 may be external to the on-chip system 622.

It should be appreciated that one or more of the method steps, operation, and/or functionality described herein may be stored in memory as computer program instructions, such as the blocks or modules described above. These instructions may be executed by any suitable processor in combination or in concert with the corresponding module to perform the methods described herein.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, NAND flash, NOR flash, M-RAM, P-RAM, R-RAM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Alternative embodiments will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A method for providing stack overflow protection in a system on chip (SoC) having a first processor and a hardware write-once register, the method comprising:
   generating, by the first processor, a first numeric value in response to a powering-up or reset of the SoC;
   initializing the hardware write-once register with the first numeric value such that the first numeric value is locked in the hardware write-once register for a duration of an operational session of the SoC until a next powering-up or reset of the SoC; and
   using, by one or more boot programs, the first numeric value in the hardware write-once register as a stack canary value to combat stack overflow attacks comprising attempts to re-write an address within the hardware write-once register containing the first numeric value.

2. The method of claim 1, further comprising:
   then rebooting the SoC;
   then generating, by the first processor, a second numeric value different from the first numeric value;
   initializing the hardware write-once register with the second numeric value; and
   using, by one or more boot programs, the second numeric value in the hardware write-once register as a stack canary value to combat stack overflow attacks.

3. The method of claim 1, wherein:
   the SoC comprises a boot read-only memory (ROM); and
   the boot ROM comprises a pseudo random number generator that generates the first numeric value.

4. The method of claim 1, wherein the hardware write-once register comprises a flip-flop having one or more secure memory elements for writing the first numeric value and, after writing the first numeric value, locking the one or more secure memory elements.

5. The method of claim 1, wherein:
   the SoC comprises a plurality of subsystems;
   each of the plurality of subsystems executes one or more respective software images; and
   each software image uses the first numeric value in the hardware write-once register as a corresponding stack canary value in combating stack overflow attacks that may be directed at the software image.

6. The method of claim 1, wherein the SoC comprises a static random-access memory (SRAM) and a dynamic random-access memory (DRAM), the using comprising:
   hosting, by the SRAM, a first software image;
   hosting, by the DRAM, a second software image;
   using, by the first software image, the first numeric value as a stack canary value; and
   using, by the second software image, the first numeric value as a stack canary value.

7. The method of claim 1, wherein the hardware write-once register defines a memory address in a system memory.

8. A system on chip comprising:
   a hardware write-once register;
   a processor configured to execute a read only memory (ROM) image which initializes the hardware write-once register with a first numeric value in response to the system on chip being powered on or reset, such that the first numeric value is locked in the hardware write-once register for a duration of an operational session of the SoC until a next powering on or reset of the SoC; and
   one or more software images configured to use the first numeric value in the hardware write-once register as a stack canary value to combat stack overflow attacks comprising attempts to re-write an address within the hardware write-once register containing the first numeric value.

9. The system on chip of claim 8, wherein the system on chip is rebooted and, in response, the hardware write-once register is initialized with a second numeric value and the one or more software images use the second numeric value in the hardware write-once register as the stack canary value.

10. The system on chip of claim 8, wherein the ROM image comprises a secure boot ROM.

11. The system on chip of claim 10, wherein the secure boot ROM comprises a pseudo random number generator that generates the first numeric value.

12. The system on chip of claim 8, wherein the hardware write-once register comprises a flip-flop having one or more secure memory elements for writing the first numeric value and, after writing the first numeric value, locking the one or more secure memory elements.

13. The system on chip of claim 8, further comprising a plurality of subsystems corresponding to the one or more software images each of which use the first numeric value in the hardware write-once register as the stack canary value.

14. The system on chip of claim 13, wherein the plurality of subsystems comprise one of a central processing unit, a boot processor, and a digital signal processor.

15. The system on chip of claim 8, wherein the hardware write-once register defines a direct memory mapped address in a system memory.

16. A system on chip (SoC) comprising:
a hardware write-once register;
a boot processor configured to execute a read only memory (ROM) image which initializes the hardware write-once register with a first numeric value in response to the SoC being powered on or reset, such that the first numeric value is locked in the hardware write-once register for a duration of an operational session of the SoC until a next powering-up or reset of the SoC; and
one or more processor subsystems with an associated software image configured to use the first numeric value in the hardware write-once register as a stack canary value to combat stack overflow attacks comprising attempts to re-write an address within the hardware write-once register containing the first numeric value.

17. The system on chip of claim 16, wherein the system on chip is rebooted and, in response, the hardware write-once register is initialized with a second numeric value used by the one or more software images as the stack canary value.

18. The system on chip of claim 16, wherein the ROM image comprises a secure boot ROM.

19. The system on chip of claim 18, wherein the secure boot ROM comprises a pseudo random number generator that generates the first numeric value.

20. The system on chip of claim 16, wherein the hardware write-once register comprises a flip-flop having one or more secure memory elements for writing the first numeric value and, after writing the first numeric value, locking the one or more secure memory elements.

21. The system on chip of claim 16, wherein the one or more processor subsystems comprise one of a central processing unit, an applications processor, and a digital signal processor.

* * * * *